Figure 1:
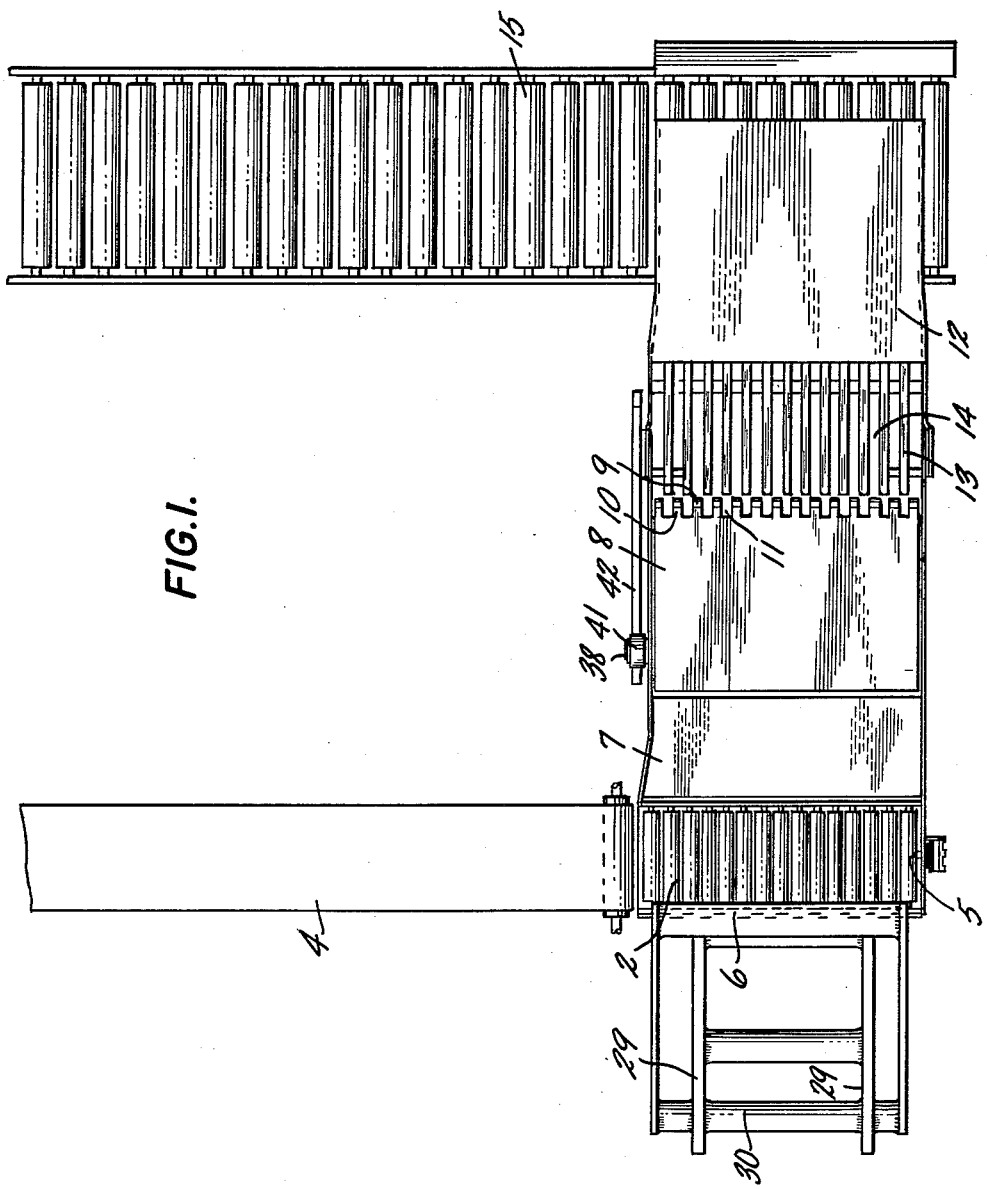

March 5, 1963 G. E. EUWE 3,080,069
METHOD AND APPARATUS FOR STACKING ARTICLES
Filed March 25, 1958 2 Sheets-Sheet 1

FIG.I.

INVENTOR.
GERRIT EVERT EUWE
BY
Brumbaugh, Free, Graves & Donohue
his ATTORNEYS.

March 5, 1963

G. E. EUWE 3,080,069

METHOD AND APPARATUS FOR STACKING ARTICLES

Filed March 25, 1958

2 Sheets-Sheet 2

INVENTOR.
GERRIT EVERT EUWE

BY his ATTORNEYS.

Уnited States Patent Office 3,080,069
Patented Mar. 5, 1963

3,080,069
METHOD AND APPARATUS FOR
STACKING ARTICLES
Gerrit Evert Euwe, Vlaardingen, Netherlands, assignor to
Lever Brothers Company, New York, N.Y., a corporation of Maine
Filed Mar. 25, 1958, Ser. No. 723,883
Claims priority, application Great Britain Mar. 27, 1957
7 Claims. (Cl. 214—6)

This invention relates to methods of and apparatus for stacking of articles into layers.

According to the present invention a method is provided for stacking articles into a plurality of superimposed layers, which articles are formed into discrete horizontal rectangular layers, each of the layers next being tilted as a whole into a substantially vertical plane, and then constraining each now vertical layer, except for the first thus formed, into a face-to-face disposition with respect to the previously formed vertical layer.

Preferably, each of said vertical layers is moved in a common direction and sense transverse to itself, a distance not less than that of its own width.

The present invention also provides a method of stacking articles which comprises the steps of establishing a substantially horizontal rectangular layer of articles on a tilting member, each layer consisting of at least two adjacent rows of articles, tilting the member to a substantially vertical position, transferring the vertical layer of articles onto a substantially horizontal stacking platform, and moving the substantially vertical layer in a horizontal direction which is in the same plane as the tilting movement through a distance not less than the width of the layer.

Also according to the present invention, apparatus is provided for successively forming discrete horizontal rectangular layers of the articles upon a tilting member, means for tilting the tilting member so as to dispose each of the horizontal layers into a substantially vertical plane and means for constraining each now vertical layer of articles thus formed, except for the first layer, into face-to-face relation with respect to the previously formed vertical layer.

Preferably the tilting member is so arranged, that each vertical layer is moved in a direction transverse to itself by an amount at least equal to the width of the vertical layer after tilting of the tilting member as an incident of the tilting movement, to transfer each vertical layer onto a stacking member.

The present invention also provides an apparatus for stacking articles comprising an L-shaped tilting member having a tilting platform and a foot, the foot being slotted, a slotted stacking platform, means for tilting the tilting member from a first position, in which the tilting platform is substantially horizontal, to a second position in which the tilting platform is substantially vertical, and for moving the tilting member downward and horizontally when the tilting platform is substantially vertical in a direction which is in the same plane as the tilting movement so that the bars delimiting the slots of the foot pass through the slots of the stacking platform.

More particularly, in accordance with the present invention, a first support member is arranged to receive one or more rows of articles, and a pusher member is provided to push the rows so formed onto the tilting member to form a horizontal layer of the articles on the tilting member. According to a further aspect of the present invention, the pusher member may be given a component of motion in the direction of movement of the articles onto the first support member and having a magnitude at least equal to the rate of reception. In a preferred embodiment of the invention, a second support member is interposed between the first support member and the tilting member, to receive rows of articles in transit between the first support member and the tilting member to enable a plurality of rows of articles to be assembled and transferred to the tilting member.

Figure 2:
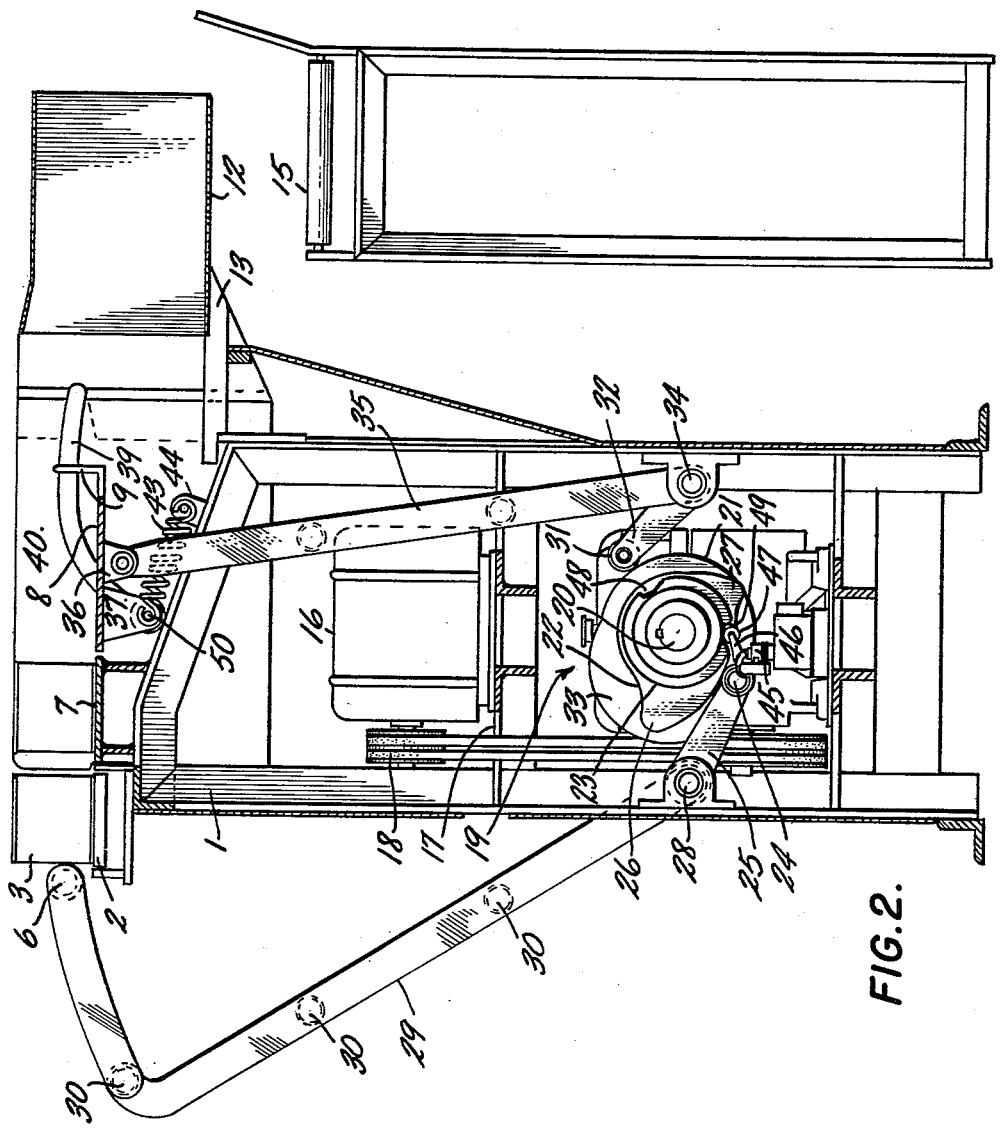

For a better understanding of the present invention, reference may be had to the accompanying drawings disclosing one embodiment of the article stacking machine and in which:

FIGURE 1 is a plan view of the machine; and
FIGURE 2 is an end elevation of the machine.

Referring to the drawings, the machine comprises a rigid framework 1 upon which is secured a roller conveyor 2 upon which articles 3 to be stacked are deposited in a closed row by a conveyor belt 4. At one end of the conveyor 2 remote from the conveyor belt 4 is disposed a micro-switch 5 which when contacted by the articles 3 is designed to actuate a stacking mechanism as described below.

To one side of the roller conveyor 2 is a longitudinal pusher member 6 disposed substantially parallel and opposite to the desired position of the row of articles 3. Co-planar with the conveyor 2 on the side opposite to the pusher member 6 is a transit platform 7 secured to the framework 1.

On the side of the transit platform 7 opposite to the roller conveyor 2 is a pivotally mounted tilting platform 8, the tilting platform 8 being co-planar with the transit platform 7 when the former is in the horizontal position. The tilting platform 8 is provided at the side remote from the transit platform 7 with a raised rim 9 integral with the platform 8 proper and comprising a plurality of bars 10 separated by open end slots 11, these slots 11 extending some distance into the surface of the tilting platform 8 itself. The tilting mechanism of the platform 8 will be described later.

Adjacent to and below the rim 9 of the tilting platform 8, when horizontal, is a stacking platform 12, the side of this platform 12 adjacent the rim 9 also having bars 13 and slots 14. Each bar 10 of the rim 9 is opposite a slot 14 of the stacking platform 12. In this way when the tilting platform 8 is tilted into the vertical position and is, at the same time, moved downwardly and towards the stacking platform 12, the bars 10 of rim 9 of the platform 8 pass through the corresponding slots 14 in the stacking platform 12, while any articles 3 resting on the rim 9 are deposited on the stacking platform 12. A roller conveyor 15 is provided at the side of the stacking platform 12 remote from the platform 8 upon which stacked and boxed articles are deposited and removed.

Referring to FIGURE 2, the actuating mechanism of the stacking machine will now be described in detail. An electric motor 16 is mounted on cross beams 17 secured to the framework 1 and drives, by means of a transmission belt 18, a reduction gear box 19 having an output shaft 20 on which are secured three separate cams 21, 22 and 23. The cams 21, 22 and 23 are of progressively reducing perimeters.

A roller 24, secured to one end of a lever 25, is constrained by gravity, a spring (not shown) or the like to ride on the surface of the cam 22. This cam 22 is provided with two lobes 26 and 27, the lobe 26 being about twice as high and long as the lobe 27. The other end of the lever 25 is rigidly secured to a horizontal shaft 28 which is rotatably mounted in the framework of the machine. A pair of parallel arms 29 are rigidly secured to the ends of the shaft 28 and are bridged by cross-bars 30 and terminate in the bridging pusher member 6.

A roller 31 is secured to one end of a lever 32 and is constrained, for example, by gravity, a spring (not shown) or the like, to ride on the surface of the cam 21, the cam 21 being provided with a lobe 33 extending over substantially half its perimeter. The other end of the lever 32 is rigidly attached to a horizontal shaft 34 rotatably mounted in the framework 1. A pair of parallel arms 35 are rigidly secured at one pair of ends to the ends of a shaft 34, the other pair of ends of the arms 35 being pivotally secured to a pair of brackets 36 rigidly attached to the tilting platform 8. A further pair of brackets 37 is also rigidly secured to the tilting platform 8, one of which pair 37 carries a horizontal pin 38 which projects at one end through an arc-shaped slot 39 formed in a guide plate 40 adjacent to one of the sides of the tilting platform 8 and secured to the framework 1.

An end of the pin 38, which projects through the slot 39, carries a roller 41 constrained to ride on an arc-shaped guide rail 42 secured to the framework 1. The shape and disposition of the guide rail 42 is such that when the arms 35 are rocked in a clockwise direction, the platform 8 is moved, by virtue of the motion of the roller 41 along the guide rail 42, and rocked into a vertical position so that the rim 9 moves downwardly below the plane of the stacking platform with the bars 10 of the rim 9 disposed in the slots 14 on the platform 12.

The other bracket 37 carries a pin 50 connected by a spring 43 to a bracket 44 secured to the framework 1. In this way the tilting platform 8 is spring biased into a horizontal position upon rotation of the arms 35 in a counter-clockwise direction.

The supply of current to the motor 16 is controlled by the micro-switch 5 and is also additionally controlled by a switch 45 having an arm 46 which carries a roller 47 spring biased against the cam 23. This cam 23 has two recesses 48 and 49 formed in its periphery and when, by virtue of rotation of the shaft 20, the switch roller 47 is biased into either of these recesses 48 or 49, the supply of current is cut off and the motor stops. The recesses 48 and 49 are adjacent to and on opposite sides of the starter cam lobe 27 and are not spaced diametrically.

The operation of the machine in stacking layers of articles 3 will now be described.

Articles 3 to be stacked are delivered in a single row by the conveyor belt 4 and deposited on the roller conveyor 2. In this way a closed row of articles 3 is formed on the roller conveyor 2, each article 3 being pushed forward by the succeeding article 3 until the foremost article 3 contacts the micro-switch 5, whereupon the supply of current to the motor 16 is switched on to cause the motor 16 to drive the shaft 20 in a counter-clockwise direction As the shaft 20 rotates, the roller 24 rides up the lobe 26 of the cam 22 with the result that the pusher member 6 moves inwardly across the roller conveyor 2 and the transit platform 7 and pushes the assembled row of articles 3 off the roller conveyor 2 onto the transit platform 7 and against a row of articles 3 on the transit platform as the result of a previous movement of the pusher member 6 arising from the riding of the roller 24 up the lobe 27 of the cam 22. The height of the cam lobe 26 is such that the pusher member 6 pushes both rows of articles 3 onto the tilting platform 8 by the time the roller 24 has arrived at the peak of the lobe 26.

It will be appreciated that as soon as the arms 29 of the pusher member 6 move across the roller conveyor 2, delivery of articles 3 from the conveyor belt 4 will be held up and the articles 3 will pile up in a row on the conveyor belt 4.

The shaft 20 continues to rotate and the roller 24 rides over the peak of the lobe 26 and the pusher member 6 withdraws to the position shown in FIGURE 2 whereupon the articles 3 on the belt 4 can again be deposited on the roller conveyor 2.

At about the same time as the pusher member 6 is being withdrawn, the roller 31 begins to move up the lobe 33 of this cam 21, and the platform 8 is tilted clockwise, by virtue of the cam action of the roller 41 riding on the guide rail 40, into a vertical position against the tension of the spring 43. As the platform 8 tilts, it moves forward in a direction normal to the two rows of articles 3 on the platform 8 and downwardly so as to deposit the new vertical layer of articles on the stacking platform 12. Forward movement of the tilting platform 8 is continued until the vertical layer of articles on the platform 8 has pushed forward any previously deposited layer on the stacking platform 12 a distance at least equal to the width of the vertical layer of articles. By this time the cam 23 has rotated sufficiently for the switch roller 47 to be biased into the recess 48, whereupon the supply of current to the motor 16 is cut off, the shaft 20 stops rotating and the tilting platform 8 remains in the vertical position.

When a further row of articles 3 has been deposited on the roller conveyor 2, the foremost article 3 contacts the micro-switch 5 thereby causing the motor 16 to operate again. The tilting platform 8 now returns to the horizontal position as the roller 31 rides down the lobe 31, while the roller 24 rides up the lobe 27 and the pusher member 6 pushes the assembled row of articles 3 on to the transit platform 7. Inasmuch as the lobe 27 is about half as high as the lobe 26, the row of articles is pushed only a sufficient distance to deposit it on the transit platform. Hence the tilting movement of the platform 8 to horizontal position is not impeded. The roller 24 then rides down the lobe 27 and in consequence pusher member 6 returns to its original position. The switch roller 47 is thereupon biased into the recess 49 and the motor 16 stops again. With the arrival of a further row of articles 3 on the roller conveyor 2 the above described sequence of events is repeated with the pusher member 6 again transferring the row of articles on the transit platform 7 and the row of articles on the conveyor 2 to the tilting platform 8. Each newly deposited layer on the stacking platform 12 pushes the previously deposited layer in a direction transverse to itself by an amount at least equal to the width of a layer.

The stacking apparatus described above can also be used for packing articles in boxes. For such a packing operation, a box may be supported on a holding device (not shown) and disposed upon its side with its mouth facing the on-coming layer of articles 3. As the foremost layer reaches the box and contacts the bottom of the box, the box is moved in the direction of motion of the layer and with the arrival of each succeeding layer the box is moved in that direction by an amount at least equal to the width of each layer. The holding device is so arranged that when the box is filled, the holding device tilts and the box is deposited on the conveyor 15 and then removed.

It may be desirable in some instances in order to prevent the possible disarrangement of the stacked layers on the stacking platform 12 to arrange the stacking platform so that it is slightly inclined away from the tilting platform.

Various modifications to the above particularly described arrangement may be made without in any way departing from the scope of the present invention. Thus, the pusher member designed to push the row of articles onto the tilting platform may be given an orbital motion in the direction of the motion of the articles on to the roller conveyor, said component of motion being at least as great as the speed of the motion of the articles on to the roller conveyor. In this way the depositing of articles on the roller conveyor can be kept substantially continous and need not be interrupted during the pushing movement of the pusher member. In this connection, it may occasionally be desirable to employ two pusher members, the first member having this component of motion and being designed to push the articles clear of the roller conveyor while a second pusher member being arranged to complete the pushing of the articles on to the tilting platform.

It will be furthermore appreciated that while in the arrangement particularly described above, the provision of a transit platform substantially extends the effective time available for the tilting platform to perform its described operations and thereby allows for a substantial reduction in the magnitudes of the kinetic forces acting on the articles during tilting, the presence of a transit platform can be effectively dispensed with and the articles can be pushed by the pusher member directly on to the tilting platform. Alternatively, where a transit platform is employed, its width may be increased by a suitable amount thereby allowing even more time for the tilting platform to perform its required operations.

In a further modification of the present invention, rows of articles may be deposited directly from, for example, a conveyor belt on to the tilting platform where they may then be compacted into a horizontal layer. Alternatively, preformed layers may be delivered by the conveyor belt directly onto the tilting member thereby obviating the need for a pusher member.

While in the above described arrangement the movement of the pusher member and the tilting platform are controlled by a cam and lever mechanism, it will be appreciated that other methods of control may be usefully employed in accordance with the present invention. Thus, for example, a rod mechanism of the type generally described in "Praktische Getriebelehre" by Kurt Rauh, published by Julius Springer Verlag, Berlin, 1954, may be usefully employed. Alternatively, the movement of the pusher member and the tilting platform may be controlled by pneumatic means.

It will be readily seen that the present invention enables articles to be stacked in vertical superimposed layers while reducing to a minimum, by virtue of the tilting operation, the kinetic forces acting on the articles during such stacking. Such a reduction is particularly useful when comparatively soft articles, such as packets of margarine for example, are being stacked, where the action of large kinetic forces could result in damage to the packet.

The exact configuration illustrated is regarded as the optimum, but some of the desirable results inherent in this disclosure may be obtained by various modifications including some departure from the exact configuration shown, and therefore the scope of the invention should be regarded as limited only by the terms of the appended claims.

I claim:

1. Apparatus for stacking articles comprising an L-shaped tilting member having a tilting platform and a foot attached to the platform in a fixed position relative thereto, the foot being slotted, a slotted stacking platform, reciprocating means for tilting the tilting member forwardly from a first position, in which the tilting platform is substantially horizontal, to a second position in which the tilting platform is substantially vertical, said tilting means moving the tilting member downwardly and horizontally when the tilting platform is substantially vertical in a direction which is the same plane as the tilting movement so that the bars delimiting the slots of the foot pass in a downward direction through the slots of the stacking platform, to deposit articles thereon and to move the articles forwardly thereon a distance at least equal to the length of the foot, and tilting the tilting member backwardly and returning it along substantially the same path to the first position.

2. Apparatus for stacking articles including a slotted stacking platform, an L-shaped tilting member comprising a tilting platform and a foot attached to said platform in a fixed and upright position relative thereto, said foot comprising bars delimiting a slotted surface, a tilting member actuating and moving means comprising a curved cam track, a cam follower fixed relative to the tilting platform and cooperating with said cam track, reciprocating means connected to said platform at a point spaced from said follower and arranged to urge in combination with said cam and cam follower said platform in a direction whereby said tilting member is tilted forwardly from a first position in which said tilting platform is substantially horizontal to a second position in which said tilting platform is substantially vertical, and said tilting member is moved downwardly and horizontally in a direction which is in the same plane as the tilting movement so that said bars delimiting the slotted surface of said foot pass in a downward direction through the slots of said stacking platform to deposit articles thereon and move them forwardly thereon a distance at least equal to the length of the foot and said tilting member is thereupon returned along substantially the same path and tilted backwardly to said first position.

3. Apparatus for stacking articles including a slotted stacking platform, an L-shaped tilting member comprising a tilting platform and a foot attached to said platform in a fixed and substantially perpendicular position relative thereto, said foot comprising bars delimiting a slotted surface, a tilting member actuating and moving means comprising a curved cam track, a cam follower fixed relative to said tilting platform and cooperating with said cam track, a lever pivotable about a fixed axis, said lever being pivotally connected to said tilting platform at a point spaced from said axis, and reciprocating means for pivoting said lever about said axis whereby said tilting member is tilted forwardly from a first position in which said tilting platform is substantially horizontal to a second position in which said tilting platform is substantially vertical, and said tilting member is moved downwardly and horizontally when said tilting platform is substantially vertical in a direction which is in the same plane as the tilting movement so that said bars delimiting the slotted surface of said foot pass through the slots of said stacking platform and said tilting member is thereupon returned and tilted backwardly to said first position.

4. Apparatus for stacking articles including a slotted stacking platform, an L-shaped tilting member comprising a tilting platform and a foot attached to said platform in a fixed and substantially perpendicular position relative thereto, said foot comprising bars delimiting a slotted surface, a tilting member actuating and moving means comprising a curved cam track, a cam follower fixed relative to said tilting platform and cooperating with said cam track, spring means holding said cam follower in said cooperating relationship with said cam track, a lever pivotable about a fixed axis, said lever at a point spaced from said axis being pivotably connected to said tilting platform, the point of connection on said platform being spaced from said follower, and reciprocating means for pivoting said lever about said axis whereby said tilting member is tilted forwardly from a first position in which said tilting platform is substantially horizontal to a second position in which said tilting platform is substantially vertical, and said tilting member is moved downwardly and horizontally when said tilting platform is substantially vertical in a direction which is in the same plane as the tilting movement so that said bars delimiting the slotted surface of said foot pass through the slots of said stacking platform and said tilting member is thereupon returned and tilted backwardly to said first position.

5. Apparatus for stacking articles including a slotted stacking platform, an L-shaped tilting member comprising a tilting platform and a foot attached to said platform in a fixed and substantially perpendicular position relative thereto, said foot comprising bars delimiting a slotted surface, a tilting member actuating and moving means comprising a curved cam track, a cam follower fixed relative to said tilting platform and cooperating with said cam track, a lever pivotable about a fixed axis, said lever at a point spaced from said axis being pivotably connected to said tilting platform, the point of connection on said platform being spaced from said follower, a rotating power shaft, a second cam rotated by said power shaft, reciprocating linkage means interposed between said second cam and said lever to actuate said lever whereby said tilting member is tilted forwardly from a first position in which said tilting platform is substantially horizontal to a second position in which said tilting platform is substantially vertical, and said tilting member is moved forwardly along a downward and horizontal path when said tilting platform is substantially vertical in a direction which is in the same plane as the tilting movement so that said bars delimiting the slotted surface of said foot pass through the slots of said stacking platform and said tilting member is thereupon returned substantially along said path and tilted backwardly to said first position, said curved cam track, lever and second cam being arranged so that said tilting platform when in said vertical position is caused to move horizontally a distance at least equal to the dimension, in the plane of the tilting movement, of the articles being stacked.

6. Apparatus for stacking articles including a slotted stacking platform, an L-shaped tilting member comprising a tilting platform and a foot attached to said platform in a fixed and substantially perpendicular position relative thereto, said foot comprising bars delimiting a slotted surface, a tilting member actuating and moving means comprising a curved cam track, a cam follower fixed relative to said tilting platform and cooperating with said cam track, a lever pivotable about a fixed axis, said lever at a point spaced from said axis being pivotably connected to said tilting platform, the point of connection on said platform being spaced from said follower, and reciprocating means for pivoting said lever about said axis whereby said tilting member is tilted forwardly from a first position in which said tilting platform is substantially horizontal to a second position in which said tilting platform is substantially vertical, and said tilting member is moved forwardly along a downward and horizontal path when said tilting platform is substantially vertical in a direction which is in the same plane as the tilting movement so that said bars delimiting the surface of said foot pass through the slots of said stacking platform and said tilting member is thereupon returned substantially along said path and tilted backwardly to said first position, said stacking platform being inclined slightly away from said tilting platform when the latter is substantially vertical.

7. Apparatus for stacking articles comprising an L-shaped tilting member having a tilting platform and a slotted foot attached to the platform in a fixed position relative thereto, a slotted stacking platform, reciprocating means for moving the tilting member forwardly toward the stacking platform and rearwardly away from the stacking platform along substantially the same path, and tilting means responsive to forward motion of the tilting member to tilt the tilting platform forwardly from a first orientation in which the tilting platform is generally horizontal to a second orientation in which the tilting platform is generally vertical so that the slotted foot passes in a downward direction through the slots of the stacking platform to deposit articles thereon and move them forwardly thereon a distance at least equal to the length of the foot and to rearward motion of the tilting member to tilt the tilting platform backwardly to the horizontal orientation.

References Cited in the file of this patent
UNITED STATES PATENTS

| | | |
|---|---|---|
| 1,551,004 | Biggert | Aug. 25, 1925 |
| 2,147,055 | Perkins | Feb. 14, 1939 |
| 2,508,698 | Von Beren | May 23, 1950 |
| 2,613,021 | Bowes | Oct. 7, 1952 |
| 2,650,009 | Kerr | Aug. 25, 1953 |
| 2,703,182 | Broberg et al. | Mar. 1, 1955 |
| 2,800,992 | Kuper | July 30, 1957 |